Herbert H. Vickers Inventor

By George J. Silhavy Attorney

Patented Oct. 10, 1950

2,525,085

UNITED STATES PATENT OFFICE 2,525,085

METHOD FOR FORMING BEVELED SPLICED INNER TUBES

Herbert Henry Vickers, Union, N. J., assignor to Standard Oil Development Company, a corporation of Delaware Application November 12, 1947, Serial No. 785,241

1 Claim. (Cl. 154—14)

This invention pertains to the manufacture of inner tubes and particularly inner tubes made of butyl rubber.

Methods and machines for the automatic splicing of inner tubes are disclosed in U. S. Patents Nos. 2,024,577, 2,024,578, 2,040,466, 2,272,881 and 2,273,463. In practicing the inventions of the above enumerated patents, the ends of a piece of inner tube stock of the proper length are clamped flat in a pair of alined clamping devices, and while so held, said ends are cut off and heated. Thereafter the freshly cut and heated ends are brought forcibly together preparatory to vulcanization.

Ordinarily the cutting or trimming of the ends of the inner tube stock is effected by vertically operating knives which give the tube end a transversely straight cut. It was proposed in U. S. Patent No. 2,273,463 of Campbell et al., to cut or trim the ends of the tube in such a manner that the line of cut is generally oblique with reference to the plane of the material. This the patentees proposed to do by holding the tube ends in a pair of clamps which are movable towards and from each other and, by moving the clamps slightly away from each other during the cutting operation, effecting a change in the line of the cut. The patent indicates that the oblique cuts or off-set cuts are so designed that when the cut ends are brought together they will first contact at one edge and continued pressure will result in progressive contact without entrapping any air between the joined surfaces.

The above mentioned methods and machines and particularly the method of the said Campbell et al. patent, are quite satisfactory for the manufacture of inner tubes of natural rubber since natural rubber inner tube compositions are extremely pliable, have a very high degree of tack, are easy to flatten completely when seized by the clamps and when brought into abutment during splicing operation and moreover they possess an enveloping quality which enables them to form a satisfactory bond between two surfaces even though they are separated by a coating of talc.

Butyl rubber or the copolymer of an isoolefin such as isobutylene and a multi olefin such as butadiene or isoprene prepared at low temperatures in the presence of Friedel-Crafts type catalysts as described in U. S. Patent No. 2,356,128 dated August 24, 1944, by Thomas and Sparks has been found to be vastly superior to natural rubber as a gas barrier and therefore superior as inner tube stock material since tires having inner tubes made thereof require inflation much less frequently.

It has been found, however, that it is extremely difficult to manufacture inner tubes of butyl rubber by the above mentioned methods and machines without forming a considerable proportion of defective tubes or rejects. Properties contributing to this difficulty are (1) the difficulty of cutting the tube stock to a perpendicular and true face; (2) the resistivity of unevenly cut faces to flattening or matching on pressure contact in the butting of the tube ends; (3) the resistivity to flattening of the folded tube causing the formation of a hollow core within the flattened tube folds; and (4) the tendency of the tube to crack at the tube folds. Property (2) or the resistance of unevenly cut faces to flattening rules out completely the usefulness of a bevel cut such as is described in the above mentioned Campbell et al. patent.

It is the object of this invention to provide a novel splice which is particularly adapted to overcome some of the above mentioned difficulties in splicing butyl rubber inner tubes.

It is also an object of this invention to provide a novel splice which does not require that the tube ends be cut to a perfectly perpendicular face in order to be capable of forming a satisfactory splice.

It is a further object of this invention to provide a splice having an increased splice area and one which increases its contact area on being stretched and an angle of bevel which is oblique to the direction of the forming stresses.

These and other objects will appear more clearly from the detailed specification and claim which follow.

I have now found that superior inner tube splices can be made by making a bevel cut on one tube end which matches an opposing bevel cut on the opposite tube end. In this way, the area of splice is enlarged to a substantial extent, depending upon the angle of bevel. When a splice is made obliquely in accordance with the present invention, the contact area of the splice increases on being stretched whereas in the case of a square end butt splice and more particularly in the case of reverse bevel splices as disclosed in the above mentioned Campbell et al. patent, the contact area of the splice decreases on being stretched. It is obvious, therefore, that splices in accordance with the present invention are substantially stronger than the splices of the prior art. Bevel cut splices in accordance with the present invention have the further advantage that minor undulations in the plane of the cut do not present the flattening problem in butting the ends that is encountered, particularly in the case of butyl rubber inner tubes with square end splices. Cutting of the inner tube stock on the bevel can be effected by means of a horizontally operating heated bevel cutter or by means of the ordinary vertically operating heated knives by arranging an appropriately shaped cutting anvil beneath the knives to hold the tube ends at the proper angle.

Reference is made to the accompanying drawing wherein the present invention is illustrated. In the drawing, Figure 1 is a side elevation of a portion of the clamping section of a tube splicing machine during the cutting operation showing suitable horizontally operating knives.

Figure 1:
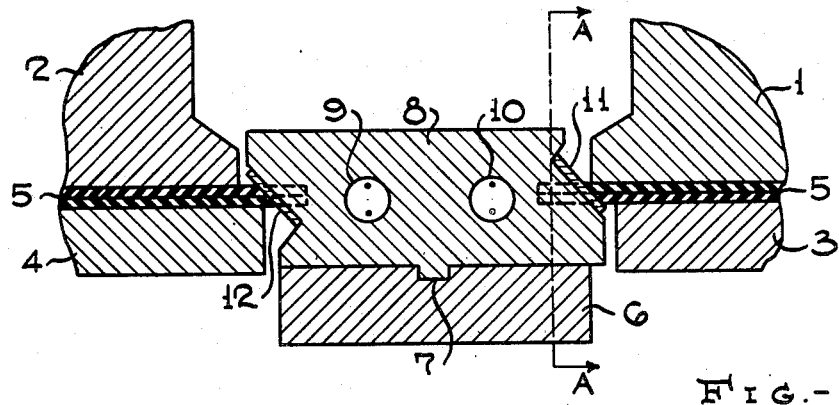
Figure 2:
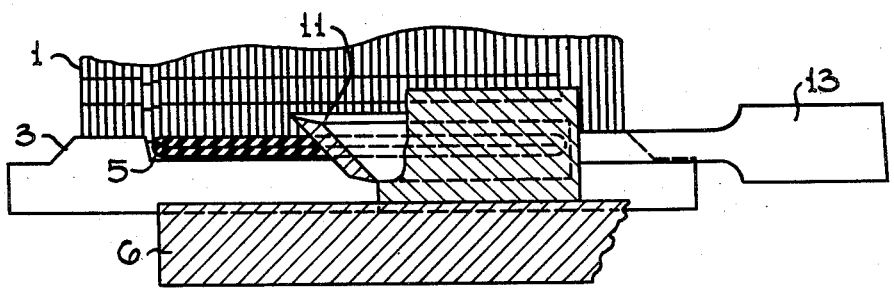
Figure 2 is a cross-sectional view through the cutting member along the line A—A of Figure 1.

Referring to Figures 1 and 2, 1 and 2 are clamp members which coact with die members 3 and 4 respectively to hold the free ends of the inner tube stocks 5. It will be understood that the clamps and die members are mounted similarly to the clamps and dies of the Campbell et al. Patent 2,273,463 for automatic movement into operative or clamping position at the start of a splicing cycle, held in operative or clamping position by means of pneumatically actuated bags and the like and that upon completion of the cutting of the free ends of the inner tube stock, the clamp and die member assemblies are moved toward each other automatically until the trimmed or freshly cut ends of the tube stock are brought into abutment under sufficient pressure to firmly bond the ends of the tube stock together. The means for closing the clamps, maintaining them under the necessary pressure for satisfactory clamping and for moving them laterally into active splicing position forms no part of the present invention and accordingly illustration thereof in the drawings is deemed unnecessary.

The bevel cutter in accordance with the present invention shown in Figure 1 comprises a supporting plate 6 which is movable manually or automatically into operative position between the clamping devices. The supporting plate 6 is provided with a groove 7 for guiding the cutter assembly during the cutting operation. The cutter assembly comprises a carriage member 8 provided with heating elements 9 and 10 and with bevel cutting knives 11 and 12. As shown in Figure 1, the clamp 1 overhangs the die 3 in order that the former may support the tube stock 5 against the action of the knife 11 while the clamp 2 is set back with respect to the front edge of the die member 4 in order that the latter may support the tube stock 5 against the action of the knife 12. The amount of off-set between the clamps and the dies may be readily adjusted to correspond to the angle of bevel of the cutting knives. As a general rule, the angle of bevel is about 45° but the cutting knives may be made readily adjustable to greater or lesser angles of bevel. Angles of bevel greater than about 60° are not particularly desirable since they are of only slight advantage over a perpendicular or straight splice while angles of bevel less than about 30° are not desirable because of the difficulty in bringing the freshly cut tube end surfaces into exact juxtaposition. The carriage is movable either manually by means of handle 13 or mechanically, if desired, across the ends of the clamps and dies trimming the tube ends to the desired length and angle of bevel. Upon completion of the cutting stroke, the knife carriage is retracted and the whole cutter assembly, i. e., guide plate 6 and cutter carriage is withdrawn to inoperative position permitting the clamping devices to be moved toward each other until the tube ends are brought into abutment under sufficient pressure to form a splice. In view of the increased splice area, and the fact that the angle of bevel is oblique to the direction of the forming stresses, the splice is much stronger and easily capable of withstanding the 60% stretch that occurs on the forming ring preliminary to vulcanization as well as the further stretching that occurs in the curing mold.

Figure 3:
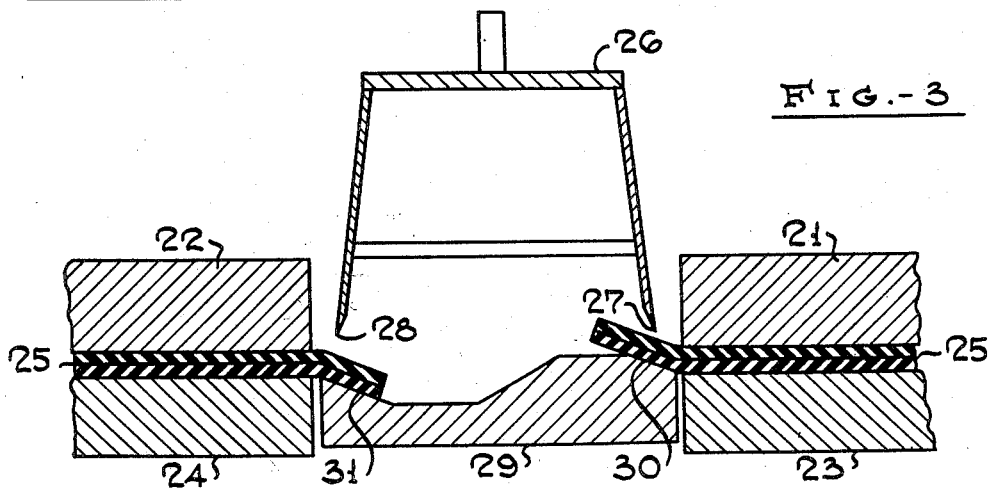
Figure 3 is a view of another embodiment wherein the bevel cut is obtained with vertically operating knives working in conjunction with a cutting anvil having offset faces permitting deflection of the tube ends to obtain a bevel cut.

In view of the fact that the above mentioned patents are designed for operation with vertically moving knives, I have provided a suitable arrangement in Figure 3 for giving bevel cuts with vertically operating knives. In this figure, 21 and 22 are clamps which coact with dies 23 and 24 to hold the free ends of the inner tube stock 25 during the cutting and splicing operations. The cutter assembly comprises a frame 26 which is mounted in suitable means, not shown, for vertical movement into operative or cutting position and into inoperative position upon completion of the cutting or trimming of the ends of the tube stock. Parallel knives 27 and 28 which are somewhat wider than the folded tube stock are mounted on the frame 26 and of necessity travel in a truly vertical path. Bevel cuts are obtained with said vertically moving knives by arranging a cutting anvil 29 beneath the knives, the cutting anvil being provided with two inclined cutting surfaces 30 and 31 for coaction with knives 27 and 28 respectively. The cutting surface 30 slopes upwardly from the plane of the top of die 23 deflecting the ends of the tube stock upwardly while cutting surface 31 declines from the plane of the top of die 24. When the knives are brought into contact with the tube stock 25, knife 28 deflects the stock downwardly into contact with cutting surface 31 and severs the tube stock at an angle which is dependent upon the angle of the surface 31. The angle of the surface 30 is the same or substantially the same as the angle of surface 31 and accordingly the knife 27 severs the tube stock supported on surface 30 at the same angle that the knife 28 cuts the tube stock in coaction with surface 31. The angle of bevel may be varied by varying the angles of the surfaces 30 and 31 which may be individually adjustable or several cutting anvils providing different angles of bevel may be provided and substituted as desired in the splicing machine.

The foregoing description contains a limited number of embodiments of the present invention. It will be understood however, that numerous variations are possible without departing from the scope of this invention.

What I claim and desire to secure by Letters Patent is:

The method of splicing a rubber inner tube which comprises clamping the ends of the tube stock in flattened opposed condition, deflecting one end of the tube stock upwardly and deflecting the other end of the tube stock downwardly at the same angle, passing a knife in a vertical path through the thus deflected inner tube stock, thereby cutting the ends of the tube stock at the same oblique angle, bringing the freshly cut surfaces together to form a splice having a large area of contact and an angle of bevel which is oblique to the direction of forming stresses.

HERBERT HENRY VICKERS.

REFERENCES CITED

The following references are of record in the file of this patent:

UNITED STATES PATENTS

| Number | Name | Date |
|---|---|---|
| 1,905,365 | Carlin | Apr. 25, 1933 |
| 2,273,463 | Campbell et al. | Feb. 17, 1942 |
| 2,273,464 | Campbell et al. | Feb. 17, 1942 |